United States Patent Office 3,127,427
Patented Mar. 31, 1964

3,127,427
10-ALKENYL-STEROIDS AND PROCESS THEREFOR
Arthur Boller and Andor Fürst, Basel, Ernst Gerhard Herzog, Birsfelden, and Hans Schmid and Richard Barner, Zurich, Switzerland, assignors to Hoffmann-La Roche Inc., Nutley, N.J., a corporation of New Jersey
No Drawing. Filed July 17, 1962, Ser. No. 210,590
12 Claims. (Cl. 260—397.3)

The present invention relates to 10-alkenyl-steroids, and to a process for their preparation. More particularly, it relates to a process whereby 3-hydroxy-steroids with an aromatic A-ring are reacted in an aqueous alkaline medium with an alkenyl compound of the formula

(I)

wherein $R^1$, $R^2$, and $R^3$ are hydrogen or lower alkyl, e.g. methyl, ethyl, propyl, isopropyl, butyl, etc., and X is an anion of a strong organic or inorganic acid, and the resulting alkenylated steroid, i.e. a 10-alkenyl-$\Delta^{1,4}$-3-keto-steroid, is isolated from the reaction mixture; and to the 10-alkenyl steroids so isolated.

Examples of alkenyl compounds of Formula I include allyl halides, such as allyl bromide, allyl chloride, or allyl iodide; dimethyl allyl halides, $\alpha$-, $\beta$-, and $\gamma$-methallyl halides, as well as the corresponding compounds which have a sulfonic acid group in place of the halogen atom, for example, the anion from methanesulfonic acid or p-toluenesulfonic acid.

The steroids with a hydroxy group in the 3-position and an aromatic A-ring that can be used as starting materials in the process of the invention include estrone, estradiol, estriol, equilenin, equilin, 17-methyl-(or ethyl, propyl, vinyl, ethinyl, hydroxyacetyl)-estradiol, 3-hydroxy-17-acetyl-(or hydroxyacetyl)-$\Delta^{1,3,5(10)}$-estratriene, 11-hydroxy-11-or 11-keto-estrone, 11-hydroxy-estradiol etc.

As the aqueous alkaline reaction medium, aqueous solutions of an alkali metal hydroxide are particularly suitable, e.g. about 0.5 N aqueous KOH or NAOH. If necessary, a water-miscible organic solvent, e.g. dioxane, or a water-miscible lower alcohol, e.g. ethanol, methanol, etc., can be added to the aqueous alkaline reaction medium to aid in solubilizing the starting materials.

In order to avoid undesired side reactions, the reaction is carried out at room temperature or at a slightly elevated temperature, suitably in the range of about 20 to about 50° C. If desired a copper or silver ion-containing catalyst, e.g. copper powder or a silver salt such as silver nitrate, silver carbonate, etc., is added to the reaction mixture.

The reaction of the alkenylating agent of Formula I with a 3-hydroxy steroid having an aromatic A-ring produces a mixture of various alkenylated steroids, from which the desired 10-alkenyl-3-keto-$\Delta^{1,4}$-steroid can be isolated by known methods, e.g. through chromatography. In addition to the named 10-alkenyl steroids, products also result with another C-alkenyl group attached to the A-ring, and products with two alkenyl groups on the same C-atom either in position 2, or, probably, in position 4, and also products with alkenylated 3-hydroxy groups (3-alkenyl ethers). By the use of estrone as a starting steroid and allyl bromide as an alkenylating agent, steroids III, IV, $V_a$, $V_b$, and VI in the following reaction scheme are found in the reaction mixture.

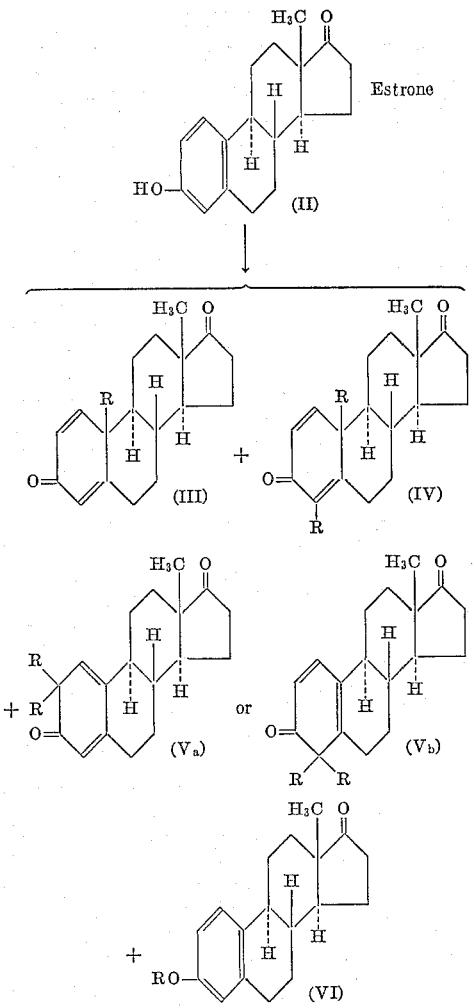

In this scheme R represents allyl.

Compounds III and IV contain a para-dienone structure, and compounds $V_a$ and $V_b$ contain an ortho-dienone structure. In compound VI the aromatic characteristic of ring A remains unchanged. Of the diene products III-$V_b$, which are the compounds with nonaromatic A-rings, the para-dienone of formula III is the main component. Accordingly, it can be seen that the process of the invention consists of a method of preparing nonaromatic steroids from 3-hydroxy steroids having aromatic A-rings by the introduction of an alkenyl group in the 10-position with the simultaneous formation of a dienone group in ring A and the conversion of the 3-hydroxy group to a 3-keto group.

The new 10-alkenyl-$\Delta^{1,4}$-3-keto-steroids prepared by the process of the invention have therapeutically useful properties, for example, are useful as androgens and anabolic agents. They can be used as medicaments in the form of pharmaceutical preparations in admixture with pharmaceutically acceptable organic or inorganic inert carrier materials, e.g. water, alcohol, gelatin, lactose, starch, magnesium stearate, talc, vegetable oils, polyethylene glycol, etc. The pharmaceutical preparations can also be in solid form, e.g. as tablets, dragées, suppositories, or capsules; or in liquid form, for example, as solutions, suspensions, or emulsions. They are preferably sterilized and can contain adjuvants, such as antioxidants, stabilizing agents, wetting agents, emulsifying agents, salts to alter the osmotic pressure, buffers, etc. They can also contain other therapeutically active materials.

The products of the invention can also be used as intermediates in the preparation of other physiologically active compounds, e.g. to form other steroids by employing methods known to those skilled in the steroid art.

EXAMPLE 1

Two g. of finely pulverized estrone ($7.4 \cdot 10^{-3}$ mole) are added to 30.0 ml. of 0.5 N aqueous potassium hydroxide and well stirred for one hour at 40°. Then a trace of copper powder is added and 1.3 ml. of allyl bromide ($15.0 \cdot 10^{-3}$ mole) dropped in with stirring during the course of one hour. Then 3 ml. of 5 N potassium hydroxide solution is added and the stirring continued for 30 minutes in order to convert additional quantities of the estrone to the potassium salt. Thereupon further allyl bromide is added dropwise during one hour. The addition of alkali and allyl bromide is continued once again in the above manner. Then the reaction mixture is stirred overnight at room temperature. The system remains inhomogeneous.

The reaction mixture is taken up in chloroform and the aqueous phase extracted with chloroform. The combined chloroform extracts are filtered, dried over anhydrous sodium sulfate, and concentrated in a rotating evaporator at room temperature, whereupon a yellow oily residue remains. This residue is taken up in a little chloroform (3 ml. as a minimum quantity) and introduced into a benzene-washed column of 100 g. of aluminum oxide. It is then eluted with 1 liter of benzene and then with benzene/ether (3:1), and fractions of 25 ml. collected. The fractions are separated by thin layer chromatography on aluminum oxide with chloroform/benzene (1:1) and spraying with a solution containing 1% potassium permanganate and 6% sodium carbonate, whereupon the compounds show yellow spots on a red background. Fractions 4–23 contain mainly the allyl ether of Formula VI (602 mg.). Fractions 25–50 are empty, while fractions 51–150 contain the dienones. Later fractions contain no more para-dienones (thin layer chromatography; IR). For the recovery of unreacted estrone the column is washed with methanol and the estrone obtained through crystallization from the nuclearly allylated phenolic product. Fractions 51–76 contain 58 mg. of a yellow crystalline material obtained by evaporation on a rotating evaporator. The yellow material crystallizes from ether/pentane in colorless prisms. This compound has either the structure of Formula $V_a$ or $V_b$. Fractions 76–93 (86 mg.) are mixed fractions containing two further dienones, one of which forming the main component in fractions 96–110 (yellow, 102 mg.) and the other in fractions 110–125 (yellow, 40 mg.). A further quantity is obtained from fractions 125–150 (46 mg.), while later fractions contain no further dienones.

From the mixed fractions 76–93 a further quantity of dienone is crystallized out (about 20 mg.), which is the compound of Formula IV. Fractions 96–150 yield about 220 mg. of a material which can be obtained colorless through further thin layer chromatography, which is the compound of Formula III (19-vinyl-$\Delta^{1,4}$-androstadien-3,17-dione).

Characteristics of the Individual Substances

All of the compounds show vinyl absorption. The orthodienone of Formula $V_a$ or $V_b$, which is obtained in about 2% yield (based on the starting estrone), is recrystallized several times from ether/pentane. Colorless prisms are obtained; melting point 133–134°;

$\lambda_{max.}^{95\% \ C_2H_5OH}$: 335 m$\mu$ ($\epsilon$=4940) $\lambda_{max.}^{CHCl_3}$ 5.79$\mu$ (5-ring-ketone), 6.02$\mu$ (conjugated carbonyl), 6.15, 6.45$\mu$ (C=C conjugation)

This compound gives 2,4-diallyl-estrone by a thermal Claisen rearrangement. The compound shows a UV maximum in the same place as 4,4-diacetoxy-$\Delta^{1,5(10)}$-estradien-3,17-dione. It is therefore possible that both allyl groups are in position 4.

The compound of Formula IV is recrystallized from ether/pentane and methanol; melting point 149–150°;

$\lambda_{max.}^{95\% \ C_2H_5OH}$: 248 m$\mu$ (11203); $\lambda_{max.}^{CHCl_3}$ 5.79$\mu$ (5-ring-ketone), 6.00$\mu$ (conjugated carbonyl), 6.15, 6.23$\mu$ (C=C conjugation)

This material, upon thermal rearrangement, gives 2,4-diallyl-estrone.

The para-dienone of Formula III, which is formed as the main component, under thin layer chromatography is shown to be homogeneous, and yields upon thermal rearrangement the same product as estrone allyl ether (VI).

$\lambda_{max.}^{95\% \ C_2H_5OH}$: 245 m$\mu$ (13500); $\lambda_{max.}^{CHCl_3}$ 5.79$\mu$ (5-ring-ketone), 6.00$\mu$ (conjugated carbonyl), 6.15, 6.22$\mu$ (C=C conjugation)

[$\Delta^{1,4}$-androstadien-3,17-dione (M.P. 141–142°) shows in comparison $\lambda_{max.}^{CHCl_3}$ 6.01, 6.16, 6.23$\mu$]

The 19-vinyl-$\Delta^{1,4}$-androstadien-3,17-dione (Formula III) forms a mono-2,4-dinitrophenylhydrazone (hydrazone formation in the 3-position) of melting point 130–131°;

$\lambda_{max.}^{95\% \ C_2H_5OH}$: 386 m$\mu$ (24300); $\lambda_{max.}^{CHCl_3}$: 5.79$\mu$ (5-ring-carbonyl)

$[\alpha]_{580}$=+280°, $[\alpha]_{700}$=+190°; and a bis-2,4-dinitrophenylhydrazone of melting point 158–159.5°.

EXAMPLE 2

12.0 g. ($4.45 \cdot 10^{-2}$ mole) of finely pulverized estrone is contacted with 178 ml. of 0.5 N potassium hydroxide solution ($8.9 \cdot 10^{-2}$ mole) in a reaction vessel which is maintained on a water bath at 40° C. After about 30 minutes 7.4 ml. (10.35 g.=$8.5 \cdot 10^{-2}$ mole) of allyl bromide is added to the mixture under intensive stirring during the course of 2 hours. Then 17.8 ml. of 5 N potassium hydroxide solution ($8.9 \cdot 10^{-2}$ mole) is added all at once and the mixture stirred for 30 minutes. Two more times 7.4 ml. of allyl bromide and 17.8 ml. of 5 N potassium solution are added. To the mixture is dropped in a fourth time 7.4 ml. of allyl bromide during the course of 2 hours, and stirring is continued overnight at room temperature. The contents of the flask are then extracted twice, each time with 100 ml. of pure benzene. The aqueous portion is saturated with sodium chloride and extracted a third time with 100 ml. of pure benzene. The combined benzene extracts are washed with water, dried over anhydrous sodium sulfate, and the benzene removed in vacuo. In order to remove the excess allyl bromide, the oily yellow residue is evaporated to dryness after the addition of 20 ml. pure benzene, and this procedure repeated two more times. Thereby 17.5 g. of a nearly odorless oil are obtained.

The crude product (17.5 g.) can be purified as follows: 1750 mls. of silicagel (particle size .2–.5 mm.) are worked into a slurry with petroleum ether (boiling range 40–50° C.) which is poured into a chromatography tube. The crude product (17.5 g.) is dissolved in 30 ml. of pure benzene and added to the silicagel column.

Elution of this column is begun with 10 liters of petroleum ether-ether (4:1), the 10 liters being allowed to run through in the course of 35–40 minutes. After removal of the solvent under vacuum at a temperature no higher than 40°, there is obtained 9.5 g. of a lemon-yellow oil, most of which crystallizes upon standing. 10 liters of petroleum ether-ether (1:1) are then run through in about 35 minutes thus yielding 4.6 g. of a brown-yellow oil. Then the column is eluted with 6–7 liters of ether and fractions of about 500 ml. each are collected. By means of thin layer chromatography the composition of the individual fractions is controlled. In general, the first ether fraction contains no 19-vinyl-$\Delta^{1,4}$-androstadien-3,17-dione. The next ether fractions (about 4–5 liters) contain 1.6 g. of this compound in about 85% purity. The last fractions are void of this compound. The product obtained (1.6 g.) can be subjected to a second purification operation as follows:

400 ml. of silicagel are mixed with petroleum ether into slurry and filled into a chromatography column. The compound (1.6 g.), dissolved in 30 ml. of pure benzene, is added to the column, and the following fractions are collected:

1500 ml. of petroleum ether
1500 ml. of petroleum ether-ether 5%
1500 ml. of petroleum ether-ether 10%
2000 ml. of petroleum ether-ether 20%
2000 ml. of petroleum ether-ether 50%

These fractions contain only diminutive amounts of steroid matter. Then the column is eluted with 5–6 liters of ether-petroleum ether (7:3) and 50 ml. fractions are collected. From fraction 2 and later fractions there are obtained 1.15 g. of 19-vinyl-$\Delta^{1,4}$-androstadien-3,17-dione which is purer than that eluted from the first chromatogram.

For the further purification of the above compound, partition chromatography by means of polyethylene powder "Hostalen W" proved to be especially suitable. n-Heptane-chloroform (4:1) can be used as the upper phase, and isopropanol-water (48:52) can be used as the lower phase; yield 1.1 g.

EXAMPLE 3

According to the process of Example 2 there is obtained 19-vinyl-$\Delta^{1,4}$-androstadien-17β-ol-3-one from estradiol in about 10% yield; properties: UV (ethanol) $\lambda_{max}$=246 mμ ($\epsilon$=14600); IR:2.94μ (OH), 6.05μ (conjugated carbonyl); 6.21μ conjugated double bond); 6.25μ (diene system), 3.30μ, 10.13μ, 10.96μ (vinyl); melting point of the 2,4-dinitrophenylhydrazone 132–133° C.

EXAMPLE 4

According to the process of Example 2, 17α-methyl-estradiol is converted in 10% yield to 17α-methyl-19-vinyl-$\Delta^{1,4}$-androstadien-17β-ol-3-one; properties:

UV=(ethanol)

$\lambda_{max}$=248 mμ ($\epsilon$=13500); IR:2.93μ (OH), 6.05μ (conjugated carbonyl), 6.19μ (conjugated double bond), 6.25μ (diene system), 10.14μ, 11.00μ (vinyl).

EXAMPLE 5

According to the process of Example 2 there is obtained 19-vinyl-$\Delta^{1,4}$-androstadiene-2-one-16α,17β-diol as amorphous material from esteriol. UV (ethanol) $\lambda_{max}$=249 mμ ($\epsilon$=11700); IR:2,93μ (OH), 6.03μ (conjugated carbonyl, 6.22μ (diene system), 10,10μ, 11,00μ (vinyl).

EXAMPLE 6

According to the process of Example 2 there is obtained 17-α-ethinyl-19-vinyl-$\Delta^{1,4}$-androstadiene-3-one-17β-ol from 17α-ethinyl-estradiol. M.P=176–178° C. UV (ethanol) $\lambda_{max}$:247 mμ ($\epsilon$=14000); IR:2,92μ (OH), 3,05μ ($\equiv$CH), 6.04μ (conjugated carbonyl), 6,20μ (conjugated double bond) 6,27μ (diene system), 5.40μ, 10,08μ (vinyl), 10,83μ (vinyl).

EXAMPLE 7

According to the process of Example 2 there is obtained 17α, 19-divinyl-$\Delta^{1,4}$-androstadiene-3-one-17β - ol from 17α-vinyl-estradiol. UV (ethanol) $\lambda_{max}$247 mμ ($\epsilon$=12900); IR=2,93μ (OH), 6,04μ (conjugated carbonyl) 6,20μ (conjugated double bond), 6,25μ (diene system), 10,11μ, 11,00μ (vinyl).

We claim:
1. A process for the preparation of 10-alkenyl-steroids comprising the steps of reacting a 3-hydroxy-steroid with an aromatic A-ring in aqueous alkaline solution with an alkenyl compound of the formula

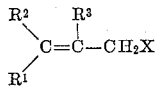

wherein $R^1$, $R^2$, and $R^3$ are selected from the group consisting of hydrogen and lower alkyl, and X is an anion of a strong acid, and isolating from the reaction mixture a 10-alkenyl-$\Delta^{1,4}$-3-keto-steroid.

2. A process according to claim 1 wherein the 3-hydroxy-steroid with an aromatic A-ring is selected from the group consisting of estrone, estradiol, estriol, equilenin, and equilin.

3. A process according to claim 1 wherein X is halogen.

4. A process according to claim 1 wherein the reaction is carried out at a temperature under about 50° C.

5. A process according to claim 1 wherein the reaction is carried out in the presence of a catalyst containing an ion selected from the group consisting of copper and silver ions.

6. A process according to claim 1 wherein estrone is reacted with allyl bromide and 19-vinyl-$\Delta^{1,4}$-androstadien-3,17-dione is isolated from the reaction mixture.

7. A process according to claim 1 wherein estradiol is reacted with allyl bromide and 19-vinyl-$\Delta^{1,4}$-androstadien-17β-ol-3-one is isolated from the reaction mixture.

8. 19-vinyl-$\Delta^{1,4}$-androstadien-3,17-dione.
9. 19-vinyl-$\Delta^{1,4}$-androstadien-17β-ol-3-one.
10. 17α-methyl-19-vinyl-$\Delta^{1,4}$-androstadien-17β-ol-3-one.
11. 17α-ethinyl-19-vinyl-$\Delta^{1,4}$-androstadien-17β-ol-3-one.
12. 17α,19-divinyl-$\Delta^{1,4}$-androstadien-17β-ol-3-one.

References Cited in the file of this patent

Barner et al.: Chimia, October 1, 1961, pp. 492–493.

UNITED STATES PATENT OFFICE
CERTIFICATE OF CORRECTION

Patent No. 3,127,427                                      March 31, 1964

Arthur Boller et al.

It is hereby certified that error appears in the above numbered patent requiring correction and that the said Letters Patent should read as corrected below.

In the heading to the printed specification, after line 9, insert the following:

Claims priority, application Switzerland July 21, 1961 column 5, line 20, for "50 ml." read -- 500 ml. --; line 54, for "-2-one-" read -- -3-one- --.

Signed and sealed this 27th day of October 1964.

EAL)
:test:

RNEST W. SWIDER
ttesting Officer

EDWARD J. BRENNER
Commissioner of Patents